(12) United States Patent
Duvaut et al.

(10) Patent No.: US 7,457,353 B2
(45) Date of Patent: Nov. 25, 2008

(54) METHOD AND SYSTEM FOR MITIGATING FOURIER TRANSFORM SIDE LOBES

(75) Inventors: Patrick Duvaut, Tinton Falls, NJ (US);
Ehud Langberg, Wayside, NJ (US);
Albert Rapaport, Morganville, NJ (US);
William Sholtz, Red Bank, NJ (US);
Faina Shmulyian, Secaucus, NJ (US)

(73) Assignee: Brooktree Broadband Holding, Inc., Newport Beach, CA (US)

( * ) Notice: Subject to any disclaimer, the term of this patent is extended or adjusted under 35 U.S.C. 154(b) by 930 days.

(21) Appl. No.: 10/849,569

(22) Filed: May 20, 2004

(65) Prior Publication Data

US 2005/0018837 A1    Jan. 27, 2005

Related U.S. Application Data

(60) Provisional application No. 60/471,732, filed on May 20, 2003.

(51) Int. Cl.
*H04B 1/38* (2006.01)
*H04B 3/20* (2006.01)
*H04M 9/08* (2006.01)

(52) U.S. Cl. .................... 375/222; 370/288; 379/406.12

(58) Field of Classification Search ................. 375/219, 375/222, 260, 347, 350, 346; 370/286–291; 379/3, 348, 93.26–93.37, 406.06–406.15
See application file for complete search history.

(56) References Cited

U.S. PATENT DOCUMENTS 6,035,000 A    3/2000 Bingham
6,516,049 B1 *  2/2003 Heidari et al. ............. 379/1.01
6,961,386 B2 * 11/2005 Klinski ....................... 375/260

(Continued)

OTHER PUBLICATIONS

Bingham, J. A. C., "RFI Suppression in Multicarrier Transmission Systems" Global Telecommunications Conference: 1996. GLOBECOM '96. Communications: The Key to Global Prosperity London, UK; Nov. 18-22, 1996 (pp. 1026-1030).

(Continued)

*Primary Examiner*—Young T. Tse
(74) *Attorney, Agent, or Firm*—Thomas, Kayden, Horstemeyer & Risley LLP (57) ABSTRACT

The present invention is directed to implementing theoretical foundations of frequency domain methods aiming to locally decrease the impact of aggregate side lobes of a few discrete frequency tones, in the vicinity of other "victim" frequencies. The family of frequency methods referred to makes use of one or more "canceller tones." The "canceller tones" loads are optimized to minimize the aggregate power in the neighborhood of the victim frequencies. An exemplary method for decreasing an impact of aggregate side lobes of one or more discrete frequency tones in the vicinity of one or more victim tones comprises the steps of calculating an aggregate power of one or more side lobes of one or more disturber tones within a victim bandwidth; determining at least one optimal load to minimize the aggregate power wherein the at least one optimal load comprises a linear combination of the one or more disturber tones; and applying the at least one optimal load to one or more canceller tones for minimizing the impact of the one or more side lobes of the one or more disturber tones.

24 Claims, 4 Drawing Sheets

U.S. PATENT DOCUMENTS 6,973,122 B1 * 12/2005 Miller, II et al. ............ 375/222
2002/0044597 A1 * 4/2002 Shively et al. ............. 375/222
2004/0021595 A1 * 2/2004 Erdogan et al. ............ 341/144

OTHER PUBLICATIONS

Chang, P.C., et al.; "Optimal Passband Transmitter and Receiver Filter Design with Application to Asymmetric Digital Subscriber Lines" 1992 International Workshop On Intelligent Signal Processing and Communication Systems, Mar. 19, 1992 (pp. 327-342).

Hwasun Yoo et al., "Edge Sidelobe Suppressor Schemes for Uplink of Orthogonal Frquency Division Multiple Access Systems" GLOBECOM '02. 2002—IEEE Global Telecommunications Conference. Conference Proceedings. Taipei, Taiwan Nov. 17-21, 2002, IEEE Global Telecommunications Conference, New York, New York: IEEE, U.S. vol. 1 of 3, Nov. 17, 2002 (pp. 584-588).

* cited by examiner

METHOD AND SYSTEM FOR MITIGATING FOURIER TRANSFORM SIDE LOBES

CROSS REFERENCE TO RELATED APPLICATIONS

This patent application claims priority to U.S. Provisional Application No. 60/471,732, filed May 20, 2003, which is hereby incorporated by reference herein in its entirety.

FIELD OF THE INVENTION

The present invention relates generally to mitigating the impact of aggregate side lobes, more particularly, to implementing frequency domain methods aiming to locally decrease the impact of aggregate side lobes of discrete frequency tones.

BACKGROUND OF THE INVENTION

With the increasing popularity of the Internet and other content-heavy electronic communication systems, there has been a substantial need for reliable and affordable high bandwidth mediums for facilitating data transmissions between service providers and their customers. In relation to the requirement that such mediums be affordable to consumers, a cost-effective manner for providing service to customers involves using infrastructure already present in most locations. Accordingly, over recent years, the two such mediums most widely meeting these requirements include cable television (CATV) and conventional copper wire telephone systems (plain old telephone system or POTS).

Relating specifically to the adaptation of POTS telephone lines to carry data at high-bandwidth or 'broadband' data rates, a number of Digital Subscriber Line (DSL) standards and protocols have been proposed. DSL essentially operates by formatting signals using various Time Domain Equalization techniques to send packets over copper wire at high data rates. A substandard of conventional DSL is known as Asymmetric Digital Subscriber Line (ADSL) and is considered advantageous for its ability to provide very high data rates in the downstream (i.e., from service provider to the user) direction by sacrificing speed in the upstream direction. Consequently, end user costs are minimized by providing higher speeds in the most commonly used direction. Further, ADSL provides a system that applies signals over a single twisted-wire pair that simultaneously supports conventional POTS or Integrated Services Digital Network (ISDN) service as well as high-speed duplex (simultaneous two-way) digital data services.

Two of the proposed standards for ADSL are set forth by the International Telecommunications Union, Telecommunication Standardization Section (ITU-T). A first, conventional, ADSL standard is described in ITU-T Recommendation G.992.1—"Asymmetric Digital Subscriber Line (ADSL) Transceivers", the body of which is incorporated herein by reference. A second, more recently proposed standard is the G.992.2 or 'G.lite' standard, further described in ITU-T Recommendation G.992.2—"Splitterless Asymmetric Digital Subscriber Line (ADSL) Transceivers", also bodily incorporated by reference herein. The G.lite standard is a variant of the G.992.1 standard, with modifications directed primarily to work in a splitterless environment (i.e., without a splitter at the remote user end to separate the voice traffic from the digital data traffic).

Because the various ITU-T recommendations identified above are designed to provide guidance to ADSL developers in various geographic locations, different circumstances may exist which impact the method with which the general recommendations are implemented. Accordingly, Annexes have been created to each specification that specifically itemize the effect of particular scenarios upon the adoption of the general recommendations. Of particular interest in the present application is the effect of a large network of conventional TCM-ISDN (Time Compression Multiplex ISDN) telephone lines on ADSL development. Annex C of the G.992.1 Recommendation directly relates to such circumstances. Due to noise and other interference generated by these ISDN systems, as well as the potential adverse impact ADSL deployment may have on these existing systems, relatively severe performance limitations have been placed upon ADSL implementation in these regions.

Disturber tones may cause residual interference when bins are switched on and off. Therefore, there is a need for a more efficient method and system for reducing interference.

SUMMARY OF THE INVENTION

Aspects of the present invention overcome the problems noted above, and realize additional advantages. A method and system of an embodiment of the present invention is directed to implementing theoretical foundations of frequency domain methods to locally decrease the impact of aggregate side lobes of a few discrete frequency tones, in the vicinity of other "victim" frequencies or tones. The family of frequency methods referred to makes use of one or more "canceller tones." Loads (or weights) may be calculated and applied to the canceller tones where the loads are optimized to minimize the aggregate power in the neighborhood of the victim frequencies. The canceller tones may be loaded with a linear combination of the disturber tones to mitigate their impact on the victim tones.

According to an exemplary embodiment, a method for decreasing an impact of aggregate side lobes of one or more discrete frequency tones in the vicinity of one or more victim tones comprises the steps of calculating an aggregate power of one or more side lobes of one or more disturber tones within a victim bandwidth; determining at least one optimal load to minimize the aggregate power wherein the at least one optimal load comprises a linear combination of the one or more disturber tones; and applying the at least one optimal load to one or more canceller tones for minimizing the impact of the one or more side lobes of the one or more disturber tones.

In accordance with other aspects of this particular embodiment of the present invention, the method further comprises the steps of calculating a minimum aggregate power of the aggregate power and calculating a cancellation gain based on a minimum aggregate power; the canceller tones are identified from the disturber tones; the aggregate power is based on an autocorrelation matrix of a vector at a scale of the victim bandwidth; wherein the aggregate power is represented as $$P(\alpha_{k_J}) \triangleq \int_{F_1}^{F_2} \left| \overset{\circ}{x}_{k_1}^{k_Q}(f) \right|^2 df$$

where $F_1$ and $F_2$ represent the victim bandwidth, $x(f)$ represents a continuous Fourier Transform and $k_1, k_Q$ represent Q disturber tones; the at least one optimal load is represented as $$a^o_{k_J} = C_{k_J} a$$

where $C_{k_J}$ represents a linear operator, a represents a dimensional vector, and $k_J$ represents a vector of canceller tone indices; the linear operator $C_{k_J}$ is represented as $C_{k_J} = -R_{k_J,k_J}^{-1} R_{k_J}$, where R represents an autocorrelation matrix and $k_J$ represents a vector of canceller tone indices; the at least one optimal load comprises a linear operator $C_{k_J}$ based on a full rank approximation; the step of determining the at least one optimal load further comprises the step of determining a sampling resolution in the frequency domain; the sampling resolution is less than a DMT frequency spacing; and the step of determining the at least one optimal load further comprises a full rank approximation using the sampling resolution.

In accordance with another exemplary embodiment, a system for decreasing an impact of aggregate side lobes of one or more discrete frequency tones in the vicinity of one or more victim tones comprises an aggregate power module for calculating an aggregate power of one or more side lobes of one or more disturber tones within a victim bandwidth; and an optimal load module for determining at least one optimal load to minimize the aggregate power wherein the at least one optimal load comprises a linear combination of the one or more disturber tones and applying the at least one optimal load to one or more canceller tones for minimizing the impact of the one or more side lobes of the one or more disturber tones.

The accompanying drawings, which are incorporated in and constitute a part of this specification, illustrate various embodiments of the invention and, together with the description, serve to explain the principles of the invention.

BRIEF DESCRIPTION OF THE DRAWINGS

The present invention can be understood more completely by reading the following Detailed Description of the Invention, in conjunction with the accompanying drawings.

DETAILED DESCRIPTION OF THE INVENTION

The following description is intended to convey a thorough understanding of the invention by providing a number of specific embodiments and details involving mitigating the impact of aggregate side lobe applications. It is understood, however, that the invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to implementing theoretical foundations of frequency domain methods to locally decrease the impact of aggregate side lobes of a few discrete frequency tones, in the vicinity of other victim frequencies (or tones). According to an embodiment of the present invention, canceller tones loads are optimized to minimize the aggregate power in the neighborhood of the victim frequencies. For example, canceller tones may be loaded with a linear combination of a load of the tones to be cancelled (e.g., disturber tones).

An embodiment of the present invention derives an explicit form of a vectorial canceller, assuming continuous and discrete frequencies within a victim bandwidth. An approximation of an optimal combiner based on a discrete frequency grid may involve certain precautions driven by a sampling theorem applied in the frequency domain and certain matrix rank conditions.

According to an embodiment of the present invention, a theoretical cancellation gain may be derived. An optimal vectorial canceller may be a linear combination of some or all other disturber tones. An optimal linear combiner may be independent of the disturber tones and thus can be calculated off line and stored in a table for real time operation.

In the following description, Q "disturber tones" may be identified as $f_k$, $k_1 \leq k \leq k_Q$. A set of "M canceller tones" $k_{J_m}$, $1 \leq m \leq M$ may be taken from the disturber tones set, $k_{J_m} \in [k_1, \ldots, k_Q]$. In addition, vector $k_J$ may collect the canceller tones indices. The victim bandwidth may include $[F_1, F_2]$. Vectors are represented in bold.

For the Time Domain, Equation 1 below provides an explicit form of a continuous time domain signal $x_{k_1}^{k_Q}(t)$ due to the Q disturber tones, where each tone may be loaded with a complex value $\alpha_k$ and may be further weighted by a rectangular extended time window which duration $\Delta$ may cover both the symbol and the prefix, as follows.

$$x_{k_1}^{k_Q}(t) = r_\Delta(t) \sum_{k=k_1}^{k=k_Q} a_k e^{j2\pi f_k t} \quad \text{Equation 1}$$

According to an exemplary embodiment, the following conditions/assumptions may apply:

$r_\Delta(t)=1$, $-\Delta/2 \leq t \leq +\Delta/2$, zero elsewhere;

$\Delta=(N+\lambda)T_s$;

$[k_1, \ldots, k_Q]$ represents series of Q disturber bins;

$T_s$ represents a sampling period (e.g., $$T_s = \frac{1}{2.208} 10^{-6} s$$

for g.992.1);

$\lambda$ represents a cyclic prefix (e.g., 32 for g.992.1, DS);

N represents a number of samples per symbol (e.g., 512 for g.992.1, DS);

$f_k = kf_0$ represents a center frequency of bin k, $k_1 \leq k \leq k_Q$ (e.g., $f_0 = 4.3125$ KHz for g.992.1).

According to the above notations, the following may apply:

$$\Delta \cdot f_k = k\left(1 + \frac{\lambda}{N}\right)NT_s f_0 = k\left(1 + \frac{\lambda}{N}\right) \quad \text{Equation 2}$$

For the Frequency Domain, Equation 3 below may represent a continuous Fourier Transform of X(t), $$\overset{\circ}{x}_{k_1}^{k_Q}(f) = \sum_{k=k_1}^{k=k_Q} a_k \cdot \overset{\circ}{r}_\Delta(f - f_k) \quad \text{Equation 3}$$

Classical properties of the Fourier transform may lead to Equation 4, $$\overset{\circ}{x}_{k_1}^{k_Q}(f) \propto \sum_{k=k_1}^{k=k_Q} a_k \cdot \sin C\left(\pi\left(1 + \frac{\lambda}{N}\right)\left(\frac{f}{f_0} - k\right)\right) \quad \text{Equation 4}$$

where, $\sin C(u) \triangleq \frac{\sin(u)}{u}$.

According to an exemplary embodiment, the following notations may apply:

$[Q-M]$ dimensional vector $a$, such that,    Equation 5

$[a]_k \triangleq a_k$ $k \neq k_J \ \& \ k \in [k_1, \ldots, k_Q]$ $[M]$ dimensional vector $a_{k_J}$, such that,    Equation 6

$[a_{k_J}]_m \triangleq a_{k_{J_m}}, 1 \leq m \leq M$ $$s_k(f) \triangleq \sin C\left(\pi\left(1 + \frac{\lambda}{N}\right)\left(\frac{f}{f_0} - k\right)\right) \quad \text{Equation 7}$$

$[Q-M]$ dimensional vector $s(f)$, such that,    Equation 8

$[s(f)]_k - s_k(f), k \neq k_J \ \& \ k \in [k_1, \ldots, k_Q]$ $[M]$ dimensional vector $s_{k_J}(f)$, such that,    Equation 9

$[s_{k_J}(f)]_m = s_{k_{J_m}}(f), 1 \leq m \leq M.$ $Q$ dimensional vectors $\tilde{s}(f) = \begin{bmatrix} s(f) \\ s_{k_J}(f) \end{bmatrix}$, and    Equation 10

$\tilde{a} = \begin{bmatrix} a \\ a_{k_J} \end{bmatrix}$

Equation 4 may be re-written in a more compact form, as provided below by Equation 11.

$$\overset{\circ}{x}_{k_1}^{k_Q}(f) \propto a^T s(f) + a_{k_J}^T s_{k_J}(f) = \tilde{a}^T \tilde{s}(f) \quad \text{Equation 11}$$

Figure 1:
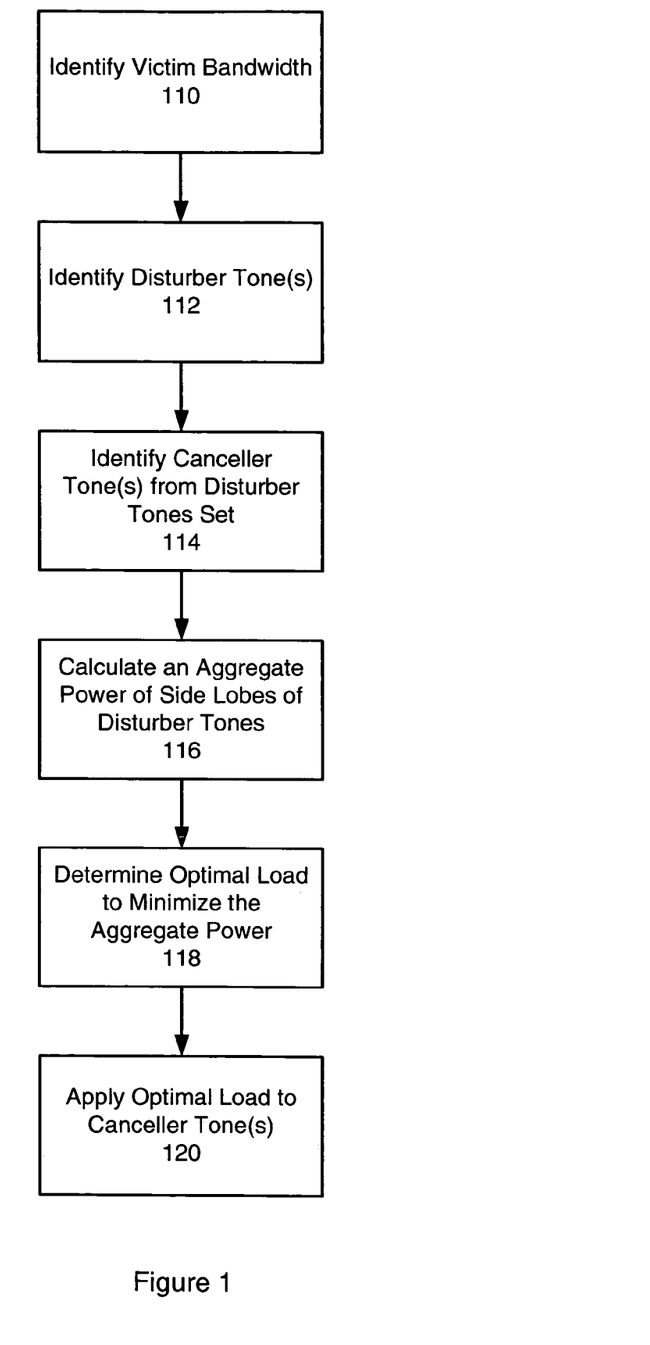
FIG. 1 is a flowchart illustrating a method for mitigating the impact of aggregate side lobes, according to an embodiment of the present invention.

FIG. 1 is a flowchart illustrating a method for mitigating the impact of aggregate side lobes, according to an embodiment of the present invention. At step 110, a victim bandwidth may be identified. At step 112, one or more disturber tones may be identified. At step 114, one or more canceller tones may be identified from the disturber tones set. At step 116, an aggregate power of one or more side lobes of one or more disturber tones may be calculated within the victim bandwidth. At step 118, one or more optimal loads (or weights) to minimize the aggregate power may be determined. For example, the optimal loads (or weights) may include a linear combination of the one or more disturber tones. At step 120, the optimal load may be applied to one or more canceller tones for minimizing the impact of the one or more side lobes of the one or more disturber tones.

Figure 2:
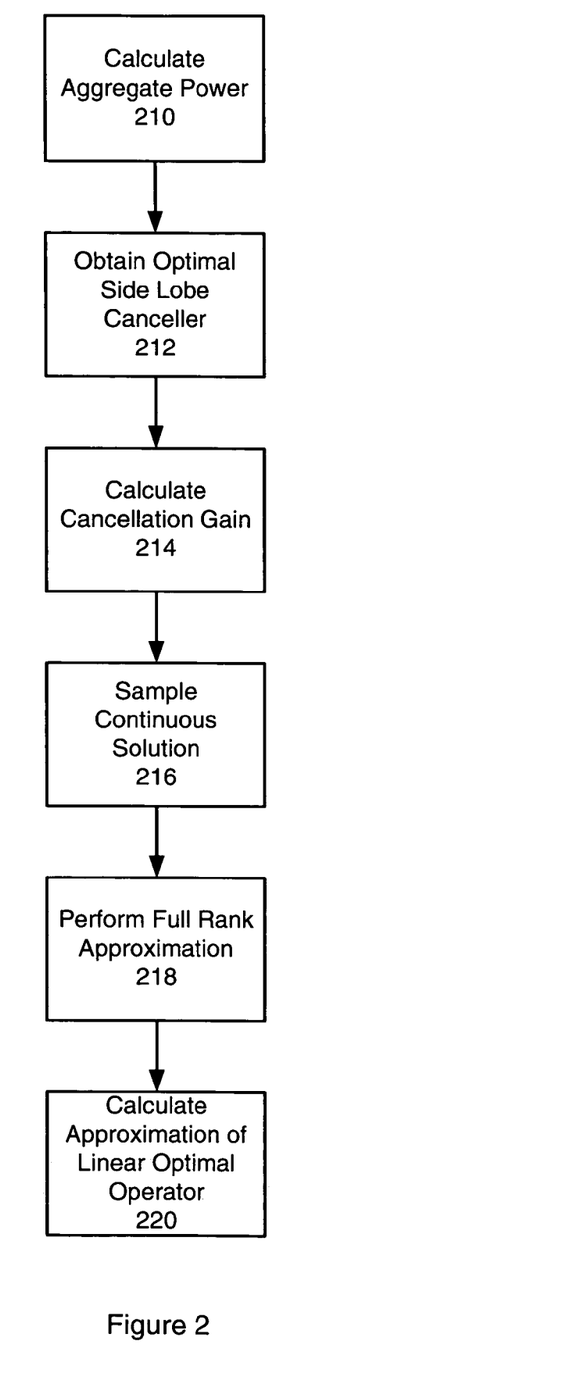
FIG. 2 is a flowchart illustrating a method for mitigating the impact of aggregate side lobes, according to an embodiment of the present invention.

FIG. 2 is a flowchart illustrating a method for mitigating the impact of aggregate side lobes, according to an embodiment of the present invention. At step 210, aggregate power may be calculated. At step 212, an optimal side lobe canceller (or optimal loads) may be obtained. At step 214, a cancellation gain may be calculated. At step 216, a continuous solution may be sampled. At step 218, a full rank approximation may be performed. At step 220, an approximation of linear optimal operator may be calculated. These steps will be discussed in further detail below.

At step 210, an aggregate power may be calculated. In particular, aggregate power $P(a_{k_J})$ within the victim bandwidth $[F_1, F_2]$ due to the disturber tones $k \in [k_1, \ldots, k_Q]$ may be represented as:

$$P(a_{k_J}) \triangleq \int_{F_1}^{F_2} \left| \overset{\circ}{x}_{k_1}^{k_Q}(f) \right|^2 df \quad \text{Equation 12}$$

The following exemplary notations may be used to write the aggregate power in a compact form (see equation 16), which may be more appropriate for optimization purposes:

$[Q-M].[Q-M]$ dimensional Matrix R, such that, $$R \triangleq \int_{F_1}^{F_2} s^*(f) s^T(f) df \quad \text{Equation 13}$$

where R represents an autocorrelation Matrix of vector S at the scale of a victim bandwidth.

$[M, Q-M]$ matrix $R_{k_J}, \ldots$, such that,    Equation 14

$$R_{k_J,\ldots} \triangleq \int_{F_1}^{F_2} s_{k_J}^*(f) s^T(f) df$$

$[M, M]$ matrix $R_{k_J, k_J}$, such that,    Equation 15

$$R_{k_J, k_J} \triangleq \int_{F_1}^{F_2} s_{k_J}^*(f) s_{k_J}^T(f) df$$

$$P(a_{k_J}) = a^+ R a + a^+ R_{\ldots, k_J} a_{k_J} + \quad \text{Equation 16}$$
$$a_{k_J}^+ R_{k_J,\ldots} a + a_{k_J}^+ R_{k_J, k_J} a_{k_J}$$

According to another exemplary embodiment, the aggregate power may be written in terms of an explicit quadratic form, as illustrated below.

$$P(a_{k_J}) = \tilde{a}^+ \tilde{R} \tilde{a} \quad \text{Equation 17}$$

where R may be based on Equations 8 and 11 above.

If the canceller tone is not loaded ($a_{k_J} = 0$), the aggregate power takes the following form:

$$P(0) = a^+ R a \quad \text{Equation 18}$$

At step 212, an optimal side lobe canceller (or optimal load) may be obtained from Equation 14 after complex derivation.

$$a^o_{k_J} = -R^{-1}_{k_J,k_J} R_{k_J,\ldots} a \triangleq C_{k_J} a \qquad \text{Equation 19}$$

The optimal side lobe canceller (or optimal load) may be based on a linear operator $C_{k_J}$ that does not depend upon the loads a:

$$-R_{k_J,k_J}^{-1} R_{k_J,\cdot} \triangleq C_{k_J} \qquad \text{Equation 20}$$

In addition, $R_{k_J,k_J}$ may be full rank because of the average inherent to the integral, see equation 15 above. The average operator of dyadic matrices may lead to a higher rank of the final matrix. For example, rank may refer to the number of rows (or columns) which are not linear combinations of other rows (or columns). Full rank may refer to when the rank is the number of rows or columns, whichever is smaller. A non-zero determinant may determine that the matrix is full rank.

At step 214, a cancellation gain may be calculated. A minimum aggregate power $P(a_{k_J})$ may be represented as:

$$P(a_{k_J}^o) = a^+ R_{S/S_{k_J}} a \qquad \text{Equation 21}$$

where $R_{S/S_{k_J}}$ is a non negative definite matrix:

$$R_{S/S_{k_J}} = R - R_{\cdot,k_J} R_{k_J,k_J}^{-1} R_{k_J,\cdot} \qquad \text{Equation 22}$$

Therefore, the cancellation gain in dB may be represented as:

$$G(a, a_{k_J}) = 10 \log_{10} \left( \frac{\tilde{a}^+ \tilde{R} \tilde{a}}{a^+ R_{S/S_{k_J}} a} \right) \qquad \text{Equation 23}$$

In approximation of an optimal side lobe canceller (or optimal load), a continuous solution may be sampled, at step 216. As displayed in equations 19, 23, 13, 14, 15, the optimal Linear Operator $C_{k_J}$ and the cancellation gain $G(a,a_{k_J})$ may depend upon integrals versus frequency. Approximation of these solutions may involve sampling in the frequency domain as shown below:

$$s_k(f) \triangleq \sin C\left( \pi \left(1 + \frac{\lambda}{N}\right)\left(\frac{f}{f_0} - k\right)\right) \qquad \text{Equation 24}$$

where $s_k(f)$ represents a Fourier Transform of a rectangular function of duration $$\Delta = \left(1 + \frac{\lambda}{N}\right)\frac{1}{f_0}.$$

Sampling in the frequency domain with the resolution $\xi$ may introduce a periodization of the time signal at $1/\xi$. To avoid time domain overlap of the folded replica along the time axis may involve the following inequality:

$$\xi^{-1} \geq \left(1 + \frac{\lambda}{N}\right)\frac{1}{f_0} \qquad \text{Equation 25}$$

This implies that resolution along the frequency axis should be smaller than a Discrete MultiTone (DMT) frequency spacing $f_0$:

$$\xi \leq \frac{f_0}{\left(1 + \frac{\lambda}{N}\right)} \qquad \text{Equation 26}$$

According to the current G.992.1 values:

$$\xi \leq \frac{f_0}{1.0625} \qquad \text{Equation 27}$$

At step 218, a full rank approximation may be performed. All (or most of) the approximations of the involved matrices may be proportional to a discrete summation such that:

$$\hat{R} \propto \sum_{n=n_1}^{n_N} s^*(\xi_n) s^T(\xi_n) \qquad \text{Equation 28}$$

$$\tilde{R} \propto \sum_{n=n_1}^{n_N} \tilde{s}^*(\xi_n) \tilde{s}^T(\xi_n) \qquad \text{Equation 29}$$

$$\hat{R}_{k_J,k_J} \propto \sum_{n=n_1}^{n_N} s^*_{k_J}(\xi_n) s^T_{k_J}(\xi_n) \qquad \text{Equation 30}$$

$$\hat{R}_{k_J,\cdot} \propto \sum_{n=n_1}^{n_N} s^*_{k_J}(\xi_n) s^T(\xi_n) \qquad \text{Equation 31}$$

with $$\xi_n = n\xi \qquad \text{Equation 32}$$

and $\xi$ following the inequality of Equation 27 to avoid time domain overlap.

In addition, boundary conditions may lead to:

$$\xi_{n_1} \approx F_1 \text{ and } \xi_{n_N} \approx F_2 \qquad \text{Equation 33}$$

The frequency resolution may also ensure that most or all the estimated matrices are full rank:

$$N \ggg Q \qquad \text{Equation 34}$$

At step 220, an approximation of a linear optimal operator may be calculated. In accordance with the conditions described in equations 32, 27, 33 and 34, the approximation of the linear optimal operator may be represented as:

$$\hat{C}_{k_J} = -\left[\sum_{n=n_1}^{n_N} s_{k_J} * (\xi_n) s^T_{k_J}(\xi_n)\right]^{-1} \left[\sum_{n=n_1}^{n_N} s_{k_J} * (\xi_n) s^T(\xi_n)\right] \qquad \text{Equation 35}$$

Figure 3:
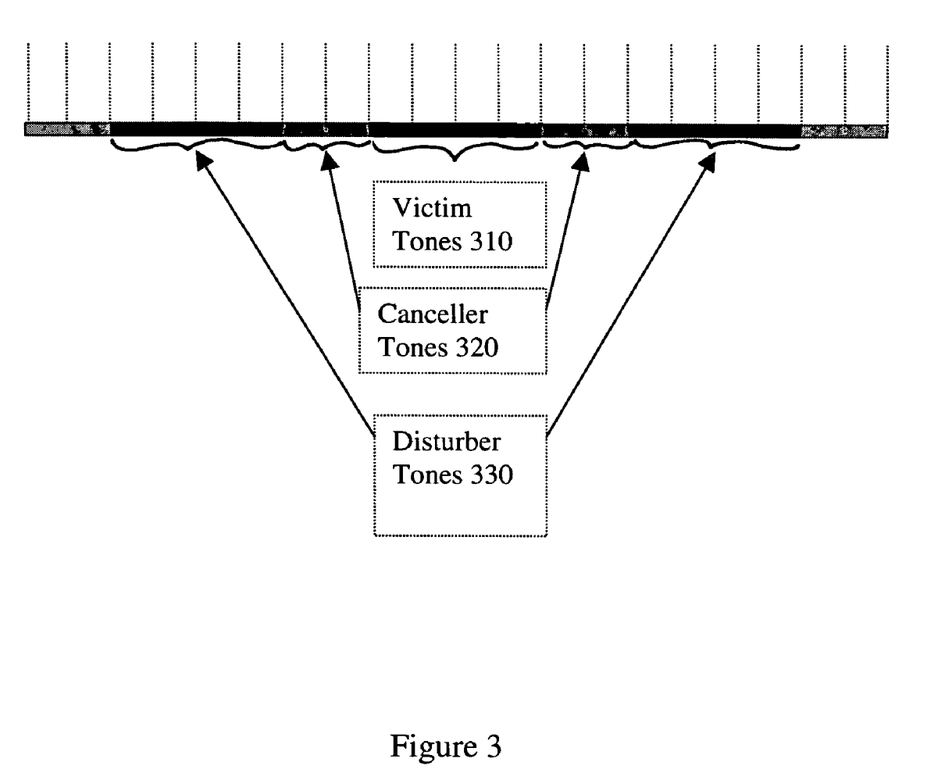
FIG. 3 is an exemplary diagram of tones for canceling side lobes in the frequency domain, according to an embodiment of the present invention.

FIG. 3 is an exemplary diagram of tones for canceling side lobes in the frequency domain, according to an embodiment of the present invention. FIG. 3 illustrates victim tones 310, canceller tones 320 and disturber tones 330. More particularly, canceller tones 320 are implemented on both sides of the victim tones 310 to mitigate the side lobes caused by the neighbor disturber tones 330. A related description of this concept has been disclosed in U.S. Provisional Application 60/524,900 entitled "Method and System for Optimizing Bit Rate in DMT Quad System," filed Nov. 26, 2003, the disclosure of which is incorporated by reference in its entirety. The data in the disturber tones 330 in each symbol may be used to generate canceller tone data that may optimally cancel side lobe energy in the victim tones. In an exemplary application, the results of this cancellation show about 5-6 dB attenuation of the side lobes inside the victim bandwidth—especially at the edges.

Figure 4:
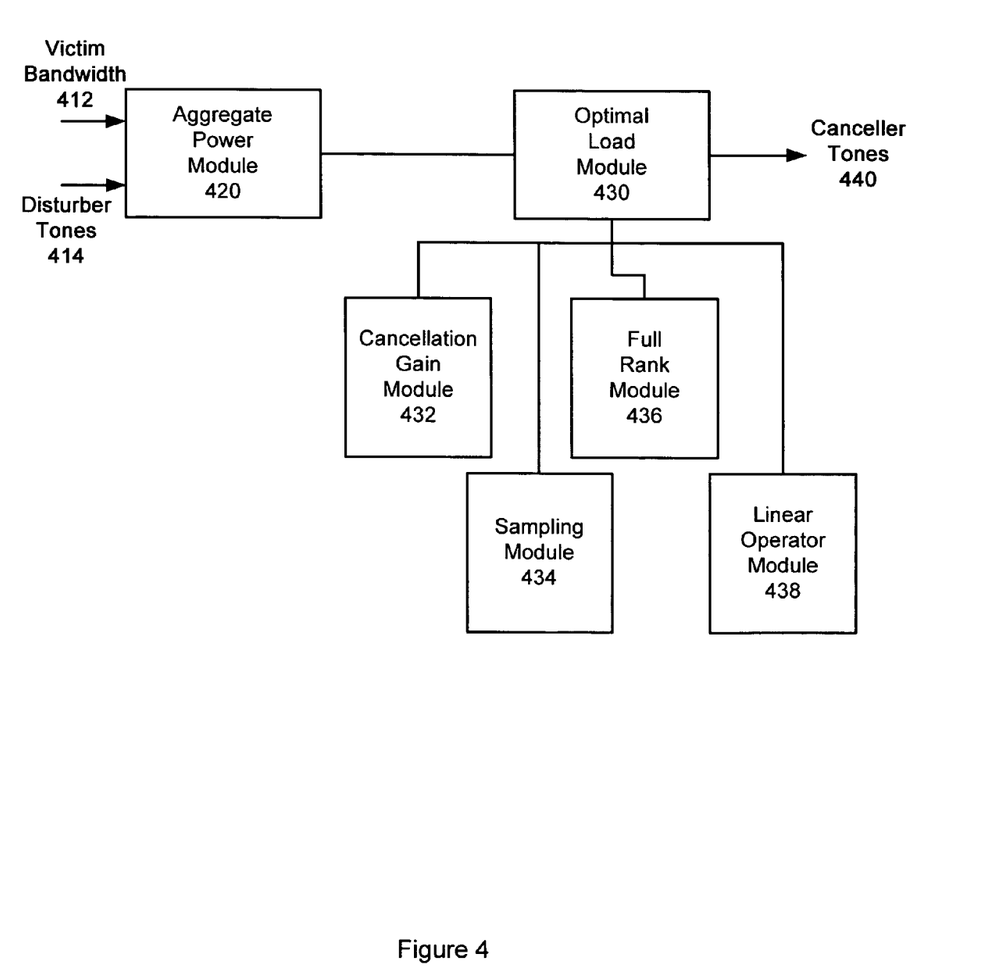
FIG. 4 is an exemplary system for mitigating the impact of aggregate side lobes, according to an embodiment of the present invention.

FIG. 4 is an exemplary system for mitigating the impact of aggregate side lobes, according to an embodiment of the present invention. Aggregate Side Lobe Mitigator 410 may include various modules, such as Aggregate Power Module 420, Optimal Load Module 430, Cancellation Gain Module 432, Sampling Module 434, Full Rank Module 436 and Linear Operator Module 438. Other modules may be included as well. While each module is shown as a single element, any of the modules may be duplicated. In addition, while the modules are shown within a single system 410, the modules may be spread across multiple systems. Other variations may be realized.

Aggregate Power Module 420 may calculate an aggregate power of one or more side lobes of one or more disturber tones 414 within a victim bandwidth 412. Optimal Load Module 430 may determine one or more optimal loads (or weights) to minimize the aggregate power. For example, the optimal loads (or weights) may include a linear combination of the one or more disturber tones, as discussed above. The optimal loads may be represented by the following equation:

$$a^o_{k_J} = -R^{-1}_{k_J,k_J} R_{k_J,.} a \triangleq C_{k_J} a$$

Optimal Load Module 430 may apply the optimal loads to one or more canceller tones 440 for minimizing the impact of the one or more side lobes of the one or more disturber tones. Cancellation Gain module 432 may calculate a cancellation gain in dB. Sampling Module 434 may sample a continuous solution. By sampling in the frequency domain as discussed above, a sampling resolution along the frequency axis smaller than DMT frequency spacing may be determined. Full Rank Module 436 may determine full rank approximation where the frequency resolution may ensure that most or all the estimated matrices are full rank. Linear Operator Module 438 may determine a linear operator, as represented by $C_{k_J}$, which may be used in determining the optimal loads at Module 430.

Variations of the inventive aspects discussed above may be applied to a wide variety of applications, such as spectral shaping in general. Other applications may involve filter designing for compliance (e.g., various standards), spectral compatibility and other purposes directed to filter design. The inventive aspects discussed above may be applied to mitigating side lobes in presence of side lobes of an existing filter, as well.

The technique of the embodiments of the present invention may be applied to shape spectrum for various purposes, including spectral compatibility, performance improvement and other applications.

According to an embodiment of the invention, the systems and processes described in this invention may be implemented on any general purpose computational device, either as a standalone application or applications, or even across several general purpose computational devices connected over a network and as a group operating in a client-server mode. According to another embodiment of the invention, a computer-usable and writeable medium having a plurality of computer readable program code stored therein may be provided for practicing the process of the present invention. The process and system of the present invention may be implemented within a variety of operating systems, such as a Windows® operating system, various versions of a Unix-based operating system (e.g., a Hewlett Packard, a Red Hat, or a Linux version of a Unix-based operating system), or various versions of an AS/400-based operating system. For example, the computer-usable and writeable medium may be comprised of a CD ROM, a floppy disk, a hard disk, or any other computer-usable medium. One or more of the components of the system or systems embodying the present invention may comprise computer readable program code in the form of functional instructions stored in the computer-usable medium such that when the computer-usable medium is installed on the system or systems, those components cause the system to perform the functions described. The computer readable program code for the present invention may also be bundled with other computer readable program software. Also, only some of the components may be provided in computer-readable code.

Additionally, various entities and combinations of entities may employ a computer to implement the components performing the above-described functions. According to an embodiment of the invention, the computer may be a standard computer comprising an input device, an output device, a processor device, and a data storage device. According to other embodiments of the invention, various components may be computers in different departments within the same corporation or entity. Other computer configurations may also be used. According to another embodiment of the invention, various components may be separate entities such as corporations or limited liability companies. Other embodiments, in compliance with applicable laws and regulations, may also be used.

According to one exemplary embodiment of the present invention, the system may comprise components of a software system. The system may operate on a network and may be connected to other systems sharing a common database. Other hardware arrangements may also be provided.

While the foregoing description includes many details and specificities, it is to be understood that these have been included for purposes of explanation only, and are not to be interpreted as limitations of the present invention. Many modifications to the embodiments described above can be made without departing from the spirit and scope of the invention.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

The invention claimed is:

1. A method for decreasing an impact of aggregate side lobes of one or more discrete frequency tones in the vicinity of one or more victim tones, the method comprising the steps of:

calculating an aggregate power of one or more side lobes of one or more disturber tones within a victim bandwidth;

determining at least one optimal load to minimize the aggregate power wherein the at least one optimal load comprises a linear combination of the one or more disturber tones; and applying the at least one optimal load to one or more canceller tones for minimizing the impact of the one or more side lobes of the one or more disturber tones.

2. The method of claim 1, further comprising the steps of:
calculating a minimum aggregate power of the aggregate power; and
calculating a cancellation gain based on the minimum aggregate power.

3. The method of claim 1 wherein the canceller tones are identified from the disturber tones.

4. The method of claim 1, where the aggregate power is based on an autocorrelation matrix of a vector at a scale of the victim bandwidth.

5. The method of claim 1, wherein the aggregate power is represented as:

$$P(\alpha_{k_J}) \triangleq \int_{F_1}^{F_2} \left| \overset{\circ}{x}_{k_1}^{k_Q}(f) \right|^2 df$$

where $F_1$ and $F_2$ represent the victim bandwidth, x(f) represents a continuous Fourier Transform and $k_1$, $k_Q$ represent Q disturber tones.

6. The method of claim 1, wherein the at least one optimal load is represented as:

$$\alpha_{k_J}^0 = C_{k_J} a$$

where $C_{k_J}$ represents a linear operator, a represents a dimensional vector, and $K_J$ represents a vector of canceller tone indices.

7. The method of claim 6, wherein the linear operator $C_{k_J}$ is represented as:

$$C_{k_J} = -R_{k_J,k_J}^{-1} R_{k_J}$$

where R represents an autocorrelation matrix and $k_J$ represents the vector of canceller tone indices.

8. The method of claim 1, wherein the at least one optimal load comprises a linear operator $C_{K_J}$ based on a full rank approximation.

9. The method of claim 1, wherein the step of determining the at least one optimal load further comprises the step of:
determining a sampling resolution in a frequency domain.

10. The method of claim 9, wherein the sampling resolution is less than a DMT frequency spacing.

11. The method of claim 9, wherein the step of determining the at least one optimal load further comprises a full rank approximation using the sampling resolution.

12. A system for decreasing an impact of aggregate side lobes of oneor more discrete frequency tones in the vicinity of one or more victim tones, the systemcomprising:
an aggregate power module for calculating an aggregate power of one or moreside lobes of one or more disturber tones within a victim bandwidth; and
an optimal load module for determining a least one optimal load to minimize theaggregate power wherein the at least one optimal load comprises a linear combination of the one or more disturber tones and applying the at least one optimal load to one or more canceller tones for minimizing the impact of the one or more side lobes of the oneor more disturber tones.

13. The system of claim 12, further comprising:
a cancellation gain module for calculating a minimum aggregate power of the aggregate power and calculating a cancellation gain based on the minimum aggregate power.

14. The system of claim 12, wherein the canceller tones are identified from the disturber tones.

15. The system of claim 12, where the aggregate power is based on an autocorrelation matrix of a vector at a scale of the victim bandwidth.

16. The system of claim 12, wherein the aggregate power is represented as:

$$P(\alpha_{k_J}) \triangleq \int_{F_1}^{F_2} \left| \overset{\circ}{x}_{k_1}^{k_Q}(f) \right|^2 df$$

where $F_1$ and $F_2$ represent the victim bandwidth, x(f) represents a continuous Fourier Transform and $k_1$, $k_Q$ represent Q disturber tones.

17. The system of claim 12, wherein the at least one optimal load is represented as:

$$\alpha_{k_J}^0 = C_{k_J} a$$

where $C_{k_J}$ represents a linear operator, a represents a dimensional vector, and $k_J$ represents a vector of canceller tone indices.

18. The system of claim 17, wherein the linear operator $C_{K_J}$ is represented as:

$$C_{K_J} = -R_{k_J,k_J}^{-1} R_{k_J}$$

where R represents an autocorrelation matrix and $k_J$ represents the vector of canceller tone indices.

19. The system of claim 12, wherein the at least one optimal load comprises a linear operator $C_{K_J}$ based on a full rank approximation.

20. The system of claim 12, further comprising: a sampling module for determining a sampling resolution in a frequency domain.

21. The system of claim 20, wherein the sampling resolution is less than a DMT frequency spacing.

22. The system of claim 20, further comprising:
a full rank module for calculating a full rank approximation using the sampling resolution.

23. At least one processor readable medium for storing a computer program of instructions configured to be readable by at least one processor for instructing the at least one processor to execute a process for performing the method as recited in claim 1.

24. A system for decreasing an impact of aggregate side lobes of one or more discrete frequency tones in the vicinity of one or more victim tones, the system comprising:
calculating means for calculating an aggregate power of one or more side lobes of one or more disturber tones within a victim bandwidth;
determining means for determining at least one optimal load to minimize the aggregate power wherein the at least one optimal load comprises a linear combination of the one or more disturber tones; and
applying means for applying the at least one optimal load to one or more canceller tones for minimizing the impact of the one or more side lobes of the one or more disturber tones.

* * * * *